United States Patent
Bellare et al.

(10) Patent No.: US 7,036,014 B2
(45) Date of Patent: Apr. 25, 2006

(54) PROBABILISTIC SIGNATURE SCHEME

(75) Inventors: Mihir Bellare, San Diego, CA (US);
Phillip Rogaway, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 865 days.

(21) Appl. No.: 09/879,849

(22) Filed: Jun. 11, 2001

(65) Prior Publication Data

US 2002/0046339 A1  Apr. 18, 2002

Related U.S. Application Data

(63) Continuation of application No. 09/020,461, filed on Feb. 9, 1998, now Pat. No. 6,266,771.

(60) Provisional application No. 60/037,530, filed on Feb. 10, 1997.

(51) Int. Cl.
*H04L 9/00* (2006.01)

(52) U.S. Cl. .................. 713/180; 713/176; 713/177

(58) Field of Classification Search ................. 713/180
See application file for complete search history.

(56) References Cited

U.S. PATENT DOCUMENTS

| | | | |
|---|---|---|---|
| 4,855,923 A | 8/1989 | Fullmer | |
| 5,136,643 A | 8/1992 | Fischer | |
| 5,146,500 A | 9/1992 | Maurer | |
| 5,263,085 A | 11/1993 | Shamir | |
| 5,371,794 A | 12/1994 | Diffie et al. | |
| 5,432,852 A | 7/1995 | Leighton et al. | |
| 5,465,299 A * | 11/1995 | Matsumoto et al. | ........ 713/176 |
| 5,475,694 A | 12/1995 | Ivanov et al. | |
| 5,475,763 A | 12/1995 | Kaufman et al. | |
| 5,483,597 A | 1/1996 | Stern | |
| 5,502,764 A | 3/1996 | Naccache | |
| 5,511,122 A | 4/1996 | Atkinson | |
| 5,515,439 A | 5/1996 | Bantz et al. | |
| 5,530,757 A | 6/1996 | Krawczyk | |
| 5,537,475 A | 7/1996 | Micali | |
| 5,577,124 A | 11/1996 | Anshel et al. | |
| 5,608,800 A | 3/1997 | Hoffmann et al. | |
| 5,666,416 A | 9/1997 | Micali | |
| 5,694,569 A | 12/1997 | Fischer | |
| 5,956,404 A | 9/1999 | Schneier et al. | |
| 6,266,771 B1 * | 7/2001 | Bellare et al. | ............... 713/176 |

* cited by examiner

*Primary Examiner*—Gilberto Barron, Jr.
*Assistant Examiner*—Cas Stulberger
(74) *Attorney, Agent, or Firm*—John P. O'Banion

(57) ABSTRACT

An RSA-based signing scheme that combines essentially optimal efficiency with attractive security properties. One preferred signing routine requires one RSA decryption plus some hashing, verifications requires one RSA encryption plus some hashing, and the size of the signature preferably is the size of the modulus. Given an ideal underlying hash function, the scheme is not only provably secure, but has security tightly related to the security of RSA. An alternative embodiment maintains all of the above features and, in addition, provides message recovery. The techniques can be extended to provide schemes for Rabin-based signatures or signatures using other trapdoor functions.

23 Claims, 4 Drawing Sheets

PROBABILISTIC SIGNATURE SCHEME

CROSS-REFERENCE TO RELATED APPLICATIONS

This application is a continuation of application Ser. No. 09/020,461 filed on Feb. 9, 1998, now U.S. Pat. No. 6,266,771, which claims priority from provisional application Ser. No. 60/037,530 filed on Feb. 10, 1997.

BACKGROUND OF THE INVENTION

1. Technical Field

The present invention relates generally to digital signature schemes and, more particularly, to an RSA-based signing scheme that combines excellent efficiency with attractive security properties.

2. Brief Description of the Related Art

In the RSA public key system, a party has public key (N,e) and secret key (N,d), where N is a k-bit modulus, the product of two (k/2)-bit primes, and $e, d \in Z_{\Phi(N)}^*$ satisfy $ed \equiv 1 \mod \Phi(N)$. The RSA function $f: Z_N^* \to Z_N^*$ is defined by $f(x)=x^e \mod N$ and its inverse $f^{-1}: Z_N^* \to Z_N^*$ is defined by $f^{-1}(y)=y^d \mod N$ (X, $y \in Z_N^*$, where $Z_N^*$ denotes the set of numbers between 1 and N−1 which are relatively prime to N). The function f can be used for encryption and $f^{-1}$ for decryption. The generally-made assumption is that f is trapdoor one-way; roughly, if one does not know d (or the prime factors of N), then it is hard to compute $x=f^{-1}(y)$ for a y drawn randomly from $Z_N^*$.

A widely employed paradigm to sign a document M is to first compute some "hash" $y=\text{Hash}(M)$ and then set the signature to $x = f^{-1}(y)=y^d \mod N$. To verify that x is a signature of M, one computes $f(x)=x^e \mod N$ and checks that this equals Hash(M) This technique is the basis for several existing standards. A necessary requirement on Hash in such a scheme is that it be collision-intractable and produce a k-bit output that encodes a point in $Z_N^*$. Accordingly, Hash is most often implemented via a cryptographic hash function like h=MD5 (which yields a 128 bit output and is assumed to be collision-intractable) and some padding. A concrete example of such a scheme is described in PKCS #1: RSA Encryption Standard (Version 1.4), June 1991, and PKCS #7, *Cryptographic Message Syntax Standard* (Version 1.4), June 1991, RSA Data Security, Inc., where the hash is:

$\text{Hash}_{PCKS}(M)=0\text{x}0001\text{FFFF} \ldots \text{FFFF}00|h(M)$.

In the above expression, the "0x" indicates that the following number is written in hexadecimal notation, and "|" denotes concatenation. Such a signature scheme may be called a "hash-then-decrypt" scheme.

The security of a hash-then-decrypt signature depends on how Hash is implemented. But the security of a scheme like $\text{Sign}_{PKCS}(M)=f^{-1}(\text{Hash}_{PKCS}(M))$ cannot be justified given only that RSA is trapdoor one-way, even under the assumption that hash function h is ideal. This is because the set of points $\{\text{Hash}_{PKCS}(M):M \in \{0,1\}^*\}$ has size at most $2^{128}$ and hence is a very sparse, and a very structured, subset of $Z_N^*$. This lack of demonstrable security is disadvantageous. In particular, although there is no known attack on this scheme, it is preferable to have a signature scheme with some proof of security. The same issue arises for other known standards, including ISO/IEC 9796. There, the hash function involves no cryptographic hashing, and the message M is easily recovered from Hash(M).

Thus, the security of the current PKCS standards, as well as that of the ISO standard, cannot be justified based on the assumption that RSA is trapdoor one-way. Other standards, such as described in *Privacy Enhancement for Internet Electronic Mail: Part III Algorithms, Modes, and Identifiers,* by Balenson, IETF RFC 1423, February, 1993, are similar to the RSA standard, and the same reasoning applies.

Signature schemes whose security can be provably based on the RSA assumption include the schemes described in the following representative publications: Goldwasser, Micali and Rivest, *A digital signature scheme secure against adaptive chosen-message attacks,* SIAM Journal of Computing, 17(2):281–308, April 1988; Bellare and Micali, *How to sign given any trapdoor permutation,* JACM Vol. 9, No. 1, 214–233, January, 1992; Naor and Yung, *Universal one-way hash functions and their cryptographic applications,* Proceedings of the 21st Annual Symposium on Theory of Computing, ACM, 1989; Rompel, *One-way Functions are Necessary and Sufficient for Secure Signatures,* Proceedings of the 22nd Annual Symposium on Theory of Computing, ACM, 1990; and Dwork and Noar, *An efficient existentially unforgeable signature scheme and its applications,* Advances in Cryptology—Crypto 94 Proceedings, Lecture Notes in Computer Science Vol. 839, Y. Desmedt. ed., Springer-Verlag, 1994. The major advantage of these works is that they can be proven to be sound, under some formalized mathematical assumption. On the other hand, these are not practical schemes; their cost (in computation time and storage) is so high that they are not considered for real world security applications.

There are additional signature schemes that have been proven secure under the assumption that a hash function which they use behaves as though it were a random function. Such schemes can be based on the hardness of factoring, or on other assumptions. Some of these schemes have been derived from identification schemes, as was first described by Fiat and Shamir, *How to prove yourself: practical solutions to identification and signature problems,* Advances in Cryptology—Crypto 86 Proceedings, Lecture Notes in Computer Science, Vol. 263, A. Odlyzko ed., Springer-Verlag, 1986. The efficiency of those schemes varies. The computational requirements are often lower than a hash-then-decrypt RSA signature, although key sizes are typically larger.

The paradigm of protocol design using hash functions that are regarded (in proofs) as random functions is thus well-developed, as described in Bellare and Rogaway, *Random oracles are practical: a paradigm for designing efficient protocols,* Proceedings of the First Annual Conference on Computer and Communications Security, ACM, 1993; and Bellare and Rogaway, *Optimal Asymmetric Encryption,* Advances in Cryptology—Eurocrypt 94 Proceedings, Lecture Notes in Computer Science Vol. 950, A. De Santis ed., Springer-Verlag, 1994.

When a signature scheme is proven secure, the security proof demonstrates how to transform an attack on the signature scheme into an attack on the underlying mathematical primitive. For example, in a scheme based on factoring numbers, the proof would show how to turn a forging algorithm against the signature scheme into a factoring algorithm. The efficiency of this "reduction" quantifies the demonstrated security. A signature scheme is said to have "tight" demonstrated security if it has been proven secure by a highly efficient reduction. Tight demonstrated security is desirable because for such a scheme the security parameter (e.g., length of RSA modulus) which is deemed adequate for the mathematical primitive is necessarily adequate for the signature scheme, too.

None of the prior art has taught a signature scheme with tight demonstrated security based on a simple construction. There remains a need in the art to provide new signature schemes that fall in the hash-then-decrypt paradigm, so that they are easy to implement, yet are simple, efficient, and practical, and, above all, have attractive security properties like tight demonstrated security. The present invention addresses this need.

BRIEF SUMMARY OF THE INVENTION

An object of the present invention is to provide new signature schemes that are as simple and efficient as standardized ones. Assuming the underlying hash function is ideal, the inventive methods are not only provably secure, but provably secure in a strong sense. In one embodiment involving RSA, signing takes one RSA decryption plus some hashing, verification takes one RSA encryption plus some hashing, and the size of the signature is the size of the modulus. The security of the inventive scheme in this embodiment is tightly related to the security of the RSA function.

The inventive teachings are also extended to provide schemes for Rabin signatures with analogous properties; in particular, their security can be tightly related to the hardness of factoring.

It is known to hash a message M onto the full domain $Z_N^*$ of the RSA function before decrypting. The signature of M is $f^{-1}(h(M))$, where h is constructed to spread its argument uniformly into $Z_N^*$. According to the present invention, such a known technique is strengthened by making the hashing probabilistic. In order to sign message M, the signer first picks a random seed r of length $k_0$, where $k_0<k$ is a parameter of the scheme (recall $k=|N|$). Then, using some hashing, in a specific way, the signer produces from M and r an image point $y=Hash_{PSS}(r,M) \in Z_N^*$. As usual, the signature is then $x=f^{-1}(y)=y^d \mod N$. Verification is more difficult, because one cannot simple re-compute a probabilistic hash of M and expect to get the same value. Still, verification takes only one RSA encryption and some hashing, as will be seen below.

The inventive scheme is as efficient as known signing schemes based on RSA. But, it can be shown that the security of the inventive scheme is tightly related to that of RSA. Thus, for example, if the RSA inversion probability was originally $2^{-61}$ (using a certain amount of computational resources), then the probability of forgery for the signature scheme is almost equally low (assuming the same computational resources).

According to the invention, signing with "message recovery" is also provided. This technique reduces the bandwidth required for sending a signed message. In this technique, rather than transmit the message M and its signature x, a single enhanced signature $\tau$, of length less than $|M|+|x|$, is transmitted. The verifier is able to recover M from $\tau$ and simultaneously check the authenticity. With security parameter k=1024, the inventive scheme enables one to authenticate a message of up to, say, n=767 bits by transmitting only a total of k bits. The signing with message recovery scheme accomplishes this by appropriately folding the message into the signature in such a way that the verifier can recover it. The computational efficiency and security are the same as for the first-described scheme.

In a further embodiment, the inventive technique is applied to the known Rabin function, with security tightly related to the hardness of factoring.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

The novel features believed characteristic of the invention are set forth in the appended claims The invention itself however, as well as a preferred mode of use, further objects and advantages thereof, are best understood by reference to the following Detailed Description of an illustrative embodiment when read in conjunction with the accompanying Drawings, wherein:

DETAILED DESCRIPTION OF THE PREFERRED EMBODIMENT

Figure 1:
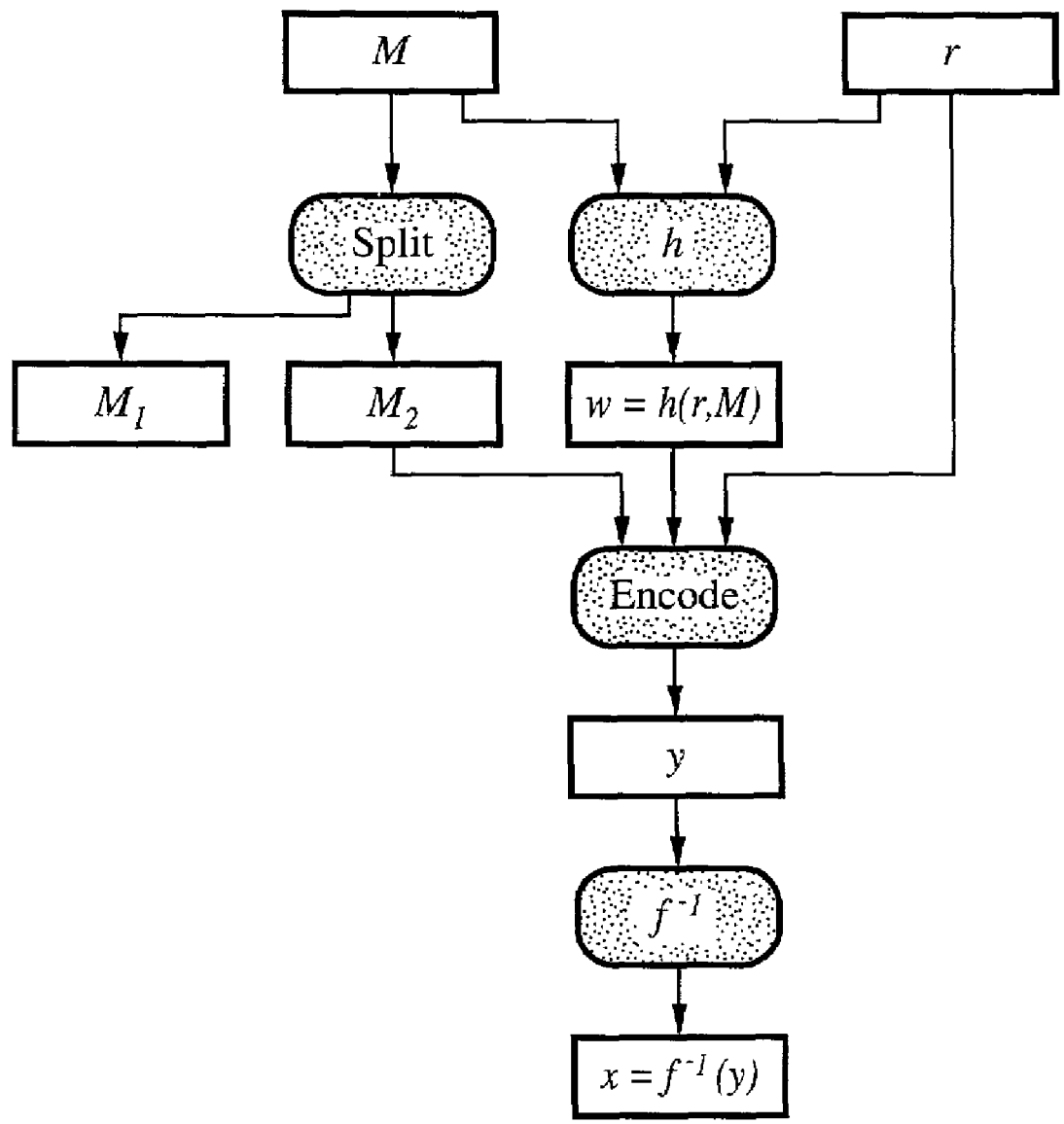
FIG. 1 is a high level description of a preferred method of signing a message according to the present invention.

By way of brief background, it is known that RSA is a family of trapdoor permutations. It is specified by the RSA generator, RSA, which, on input k, picks a pair of random distinct (k/2)-bit primes and multiplies them to produce a modulus N. It also picks, at random, an encryption exponent $e \in Z_{\Phi(N)}^*$ and computes the corresponding decryption exponent d so that $ed \equiv 1 \mod \Phi(N)$. The RSA generator returns N, e, d, these values specifying $f: Z_N^* \to Z_N^*$ and $f^{-1}: Z_N^* \to Z_N^*$, which are defined by $f(x)=x^e \mod N$ and $f^{-1}(y)=y^d \mod N$. Both functions are permutations, and, as the notation indicates, inverses of each other. The function f is the RSA encryption primitive and the function $f^{-1}$ is the RSA decryption primitive.

The trapdoor permutation generator RSA-3 is identical to RSA except that the encryption exponent e is fixed to be 3. More generally, RSA-e provides an encryption exponent of the specified constant. Other variants of RSA use a somewhat different distribution on the modulus N. The present invention, although stated for RSA, also hold for these other variants.

An inverting algorithm for RSA, I, gets input N, e, y and tries to find $f^{-1}(y)$. Its success probability is the probability that it outputs $f^{-1}(y)$ when N, e, d are obtained by running RSA(k) and y is set to f(x) for an x chosen at random from $Z_N^*$. The standard asymptotic definition of security requires that the success probability of any PPT (probabilistic, polynomial time) algorithm be a negligible function of k. The present invention goes further and, in particular, is interested in exactly how much time an inverting algorithm uses and what success probability it achieves in this time. Formally, an inverting algorithm is said to be a t-inverter, where t: IN→IN, if its running time plus the size of its description is bounded by t(k), in some fixed standard model of computation. The function I (t,∈)-breaks RSA, where ∈: IN→[0, 1], if I is a t-inverter and for each k the success probability of I is at least ∈(k). The generator RSA is (t, ∈)-secure if there is no inverter which (t, ∈)-breaks RSA.

By way of further background, a digital signature scheme Π=(Gen, Sign, Verify) is specified by a key generation algorithm, Gen, a signing algorithm, Sign, and a verifying algorithm, Verify. The first two are probabilistic, and all three should run in expected polynomial time. Given k, the key generation algorithm outputs a pair of matching public and secret keys, (pk,sk). The signing algorithm takes the message M to be signed and the secret key sk, and it returns a signature $x=\text{Sign}_{sk}(M)$. The algorithm may entail probabilistic choices. The verifying algorithm takes a message M, a candidate signature x', and the public key pk, and it returns a bit $\text{Verify}_{pk}(M,x')$ with "1" signifying "accept" and "0" signifying "reject." If x was produced via $x \leftarrow \text{Sign}_{sk}(M)$, then $\text{Verify}_{pk}(M,x)=1$.

One or more strong hash functions will usually be available to the algorithms Sign and Verify, with their domain and range depending on the scheme. According to the present invention, these functions are modeled as ideal, meaning that if hash function h is invoked on some input, the output is a uniformly distributed point of the range. If invoked twice on the same input, the same result is returned both times. In security proofs, h is modeled as a public random oracle (a "hash oracle") to be accessed via oracle queries, i.e., an algorithm can write a string z and get back h(z) in time |z|.

Definitions for the security of signatures in the asymptotic setting are known in the art. The following describes an "exact version" of these definitions. In particular, a forger takes as input a public key pk, where (pk,sk)←Gen(k), and tries to forge signatures with respect to pk. The forger is allowed a chosen message attack in which it can request, and obtain, signatures of messages of its choice. This is modeled by allowing the forger access to the signing algorithm. The forger is deemed successful is it outputs a valid forgery, namely, a message/signature pair (M,x) such that $\text{Verify}_{pk}(M,x)=1$ but M was not a message of which a signature was earlier requested. The forger is said to be a (t, $q_{sig}$, $q_{hash}$)-forger if its running time plus description size is bounded by t(k); it makes at most $q_{sig}(k)$ queries of its signing oracle; and it makes a total of at most $q_{hash}(k)$ queries of its various hash oracles. Such a forger F is said to (t, $q_{sig}$, $q_{hash}$, ∈)-break the signature scheme if, for every k, the probability that F outputs a valid forgery is at least ∈(k). The signature scheme (Gen, Sign, Verify) is (t, $q_{sig}$, $q_{hash}$, ∈)-secure if there is no forger who (t, $q_{sig}$, $q_{hash}$, ∈)-breaks the scheme.

Referring now to FIG. 1, there is illustrated a high level description of a preferred method of signing a message according to the present invention. If M is the message desired to be signed, then the scheme begins by selecting a random, pseudorandom or otherwise time-varying seed value r. Such a value is sometimes referred to as a "nonce." A hash function then takes two arguments: the message M and the nonce r. The hash function then produces a keyed hash w=h(r,M). As also seen in the figure, the message is split into two pieces, a first portion $M_1$ and a second portion $M_2$, wherein the message M is easily recoverable from knowledge of the first and second portions. It is possible that the first portion or the second portion may take on a null value (or is "void"), such that the remaining portion is then the entire message.

Then, the signing routine encodes into an image point y (1) the hash value h(r,M), (2) seed value r, and (3) the second portion $M_2$ of the message M. These values are encoded in such a way so that r, $M_2$ and h(r,M) each are recoverable given an image point y. Then, the image point y is subjected to the decryption primitive f⁻to generate the signature x of the message M. The remaining portion $M_1$ of the message (namely, that portion that was not encoded into the image point) is then concatenated or otherwise combined with the signature to form the enhanced signature x.

Thus, according to the invention, the message M to be signed is decomposed or otherwise split into first and second portions. One of the portions, in effect, is "folded" into the trapdoor permutation, while the other portion (i.e., the portion that does not fit) gets transmitted with the signature x to facilitate the authentication. Thus, the signature scheme is a combined "signature with appendix" and "signature permitting message recovery" scheme within the meaning of ISO/IEC 9796 and ISO/IEC 14888-1.

A keyed hashing function of M is used with a seed value r, wherein the seed value is communicated in some way in the image point. Preferably, a random seed value r is used for each message. The image point is unpredictable due to the seed value.

Figure 2:
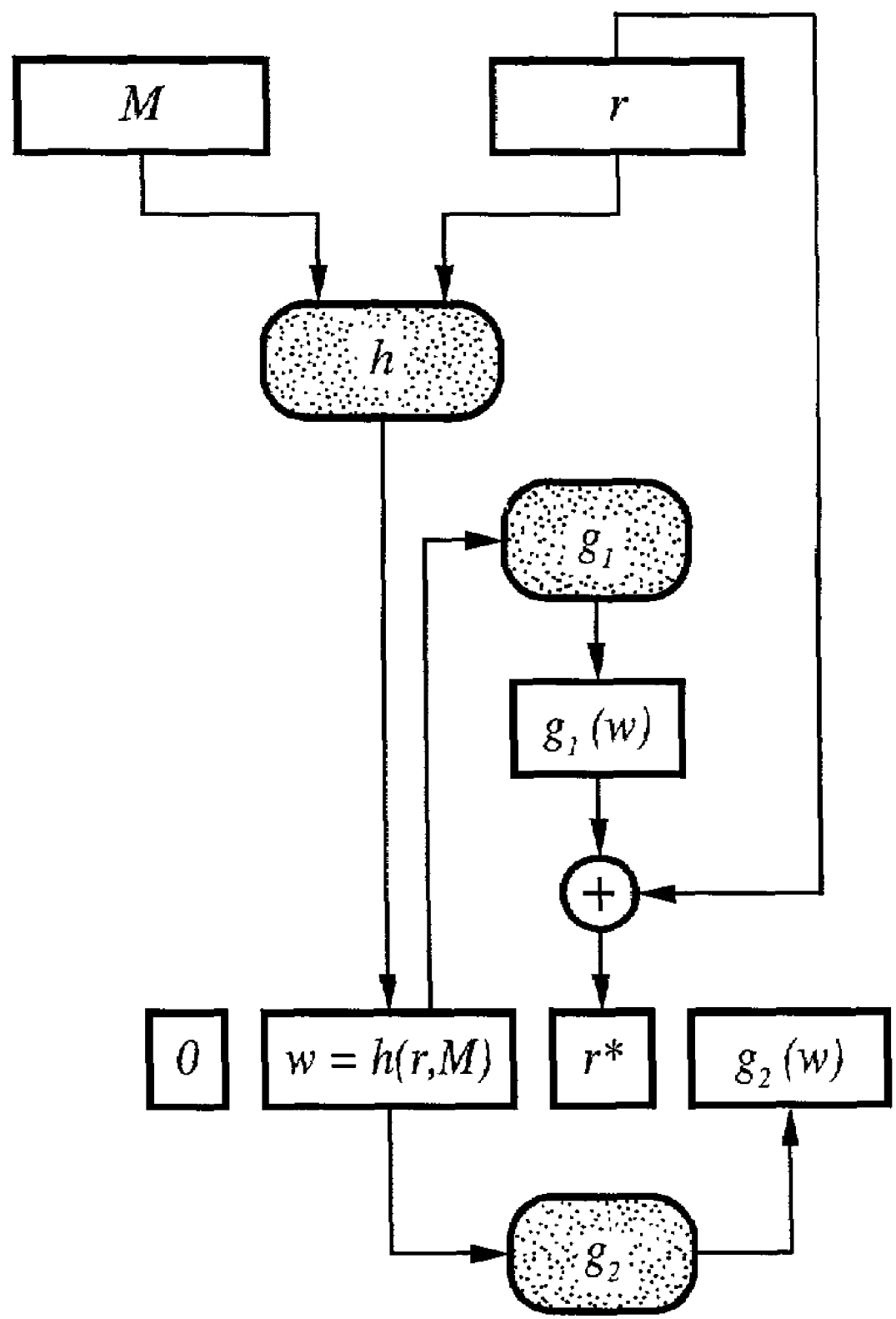
FIG. 2 is a diagram illustrating a preferred technique for generating an image point in a first signature scheme PSS of the present invention.

Referring now to FIG. 2, a first detailed embodiment of the inventive probabilistic signature scheme is now illustrated and described. The scheme $PSS[k_0,k_1]$ is described by a key generation algorithm GenPSS, a signing algorithm SignPSS and a verifying algorithm VerifyPSS. The latter two algorithms are parameterized by $k_0$ and $k_1$, which are numbers between 1 and k satisfying the relationship $k_0+k_1 \leq k-1$. Thus, for example, k=1024, and $k_0=k_1=128$. Such values, of course, are merely representative. The key generation algorithm GenPSS runs RSA(k) to obtain (N,e, d), and outputs (pk, sk), where the public key is pk=(N,e) and the secret key is sk=(N,d).

As illustrated in FIG. 2, the signing and verifying algorithms preferably make use of two hash functions. The first, h, sometimes referred to as a compressor, maps as h: $\{0,1\}^* \times \{0,1\}^* \rightarrow \{0,1\}^{k1}$ and the second, g, sometimes referred as the generator, maps as g: $\{0,1\}^{k1} \rightarrow \{0,1\}^{k-k1-1}$. These functions are preferably implemented from conventional cryptographic hash functions, such as MD5 or SHA-1, as will be described below. For purposes of the scheme, $g_1$ is a function that, on input $w \in \{0,1\}^{k1}$, returns the first $k_0$ bits of g(w), and $g_2$ is a function that, on input $w \in \{0,1\}^{k1}$, returns the remaining $k-k_0-k_1-1$ bits of g(w). The signature x of a message M (sometimes referred to herein as a data string) is then:

SignPSS (M)

$r \leftarrow \{0,1\}^{k0}$; $w \leftarrow h(r,M)$; $r^* \leftarrow g_1(w) \oplus r$ $y \leftarrow 0|w|r^*|g_2(w)$ return $y^d$ mod N Thus, given the message M and signature x, verification proceeds as follows:

VerifyPSS $y \leftarrow x^e$ mod N

Let y be decomposed as: b|w|r*|γ, (where b is the first bit of y, w the next $k_1$ bits, r* the next $k_0$ bits, and γ the remaining bits)

$r \leftarrow r^* \oplus g_1(w)$ if (h(r,M)=w and $g_2(w)=γ$ and b=0), then return 1; otherwise, return 0.

Above, the step $r \leftarrow \{0,1\}^{k0}$ indicates that the signer picks (preferably at random) a seed r of $k_0$ bits. The signer then hashes this seed with the message M, for example, by concatenating these strings and applying some cryptographic hash function (such as SHA-1). The result is a $k_1$-bit string w. Then, the generator g is applied to w to yield a $k_0$-bit string $g_1(w)$ and a $k-k_0-k_1-1$ bit string $g_2(w)$. The first bit string is then used to "mask" the $k_0$-bit seed r, resulting in the masked seed r*. Then, w|r* is prepended with a 0 bit and appended with $g_2(w)$ to create the image point y, which is decrypted under the RSA function to yield the signature x. The 0-bit is to substantially guarantee that y is in $Z_N^*$. Preferably, a new seed is chosen for each message. In particular, a given message has many possible signatures, depending on the value of r chosen by the signer.

Given (M,x), the verifier first computes $y=x^e$ mod N and recovers r*, w and r. These values are then used to check that y was correctly constructed, and the verifier only accepts the message if all the checks succeed. Thus, signing takes one application of h, one application of g, and one RSA decryption, while verification takes one application of h, one application of g, and one RSA encryption. Thus, the scheme is quite efficient.

Figure 3:
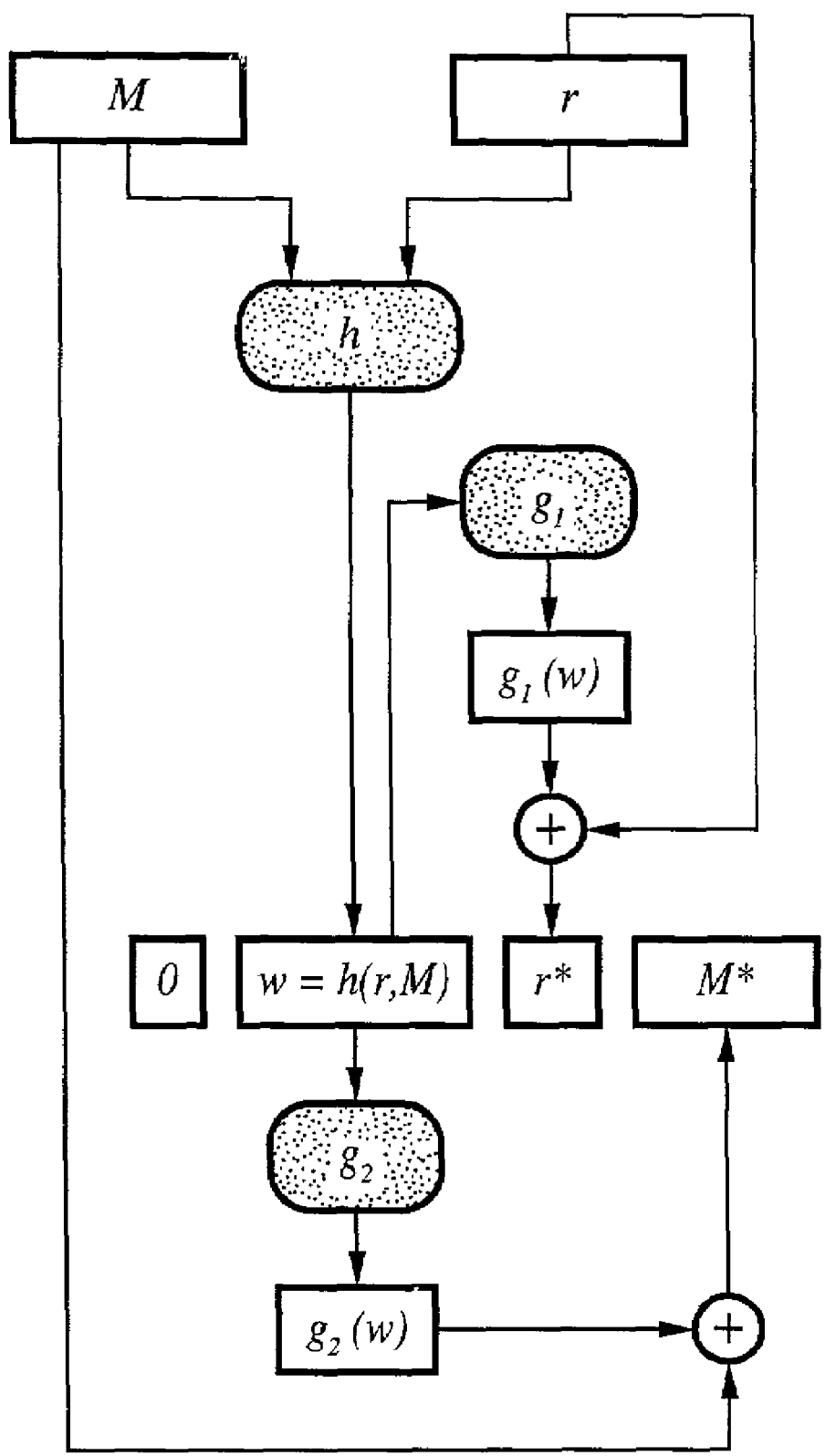
FIG. 3 is a diagram illustrating a preferred technique for generating an image point in a second signature scheme PSS-R of the present invention.

Another embodiment of the invention is illustrated in FIG. 3, and is now described. By way of brief background, in a standard signature scheme, the signer transmits the message M in the clear, attaching to it the signature x. In a scheme that provides "message recovery," only an "enhanced signature" x is transmitted. The goal is to save on the bandwidth for sending a signed message. In particular, it is desired that the length of this enhanced signature to be smaller than |M|+k. When M is short enough, it is desired that the length of x be k, the signature length. The verifier then recovers the message M from the enhanced signature and checks authenticity at the same time.

Signing with message recovery is accomplished according to the present invention by "folding" some or all of the message into the signature in such a way that it is "recoverable" by the verifier. When the length n of M is small, the entire message can be folded into the signature, so that only a k-bit quantity is transmitted. In the preferred scheme defined below, if the security parameter is k=1024, $k_0$=128, and $k_1$=128, one can fold up to 767 message bits into the signature. This value, of course, is merely representative.

In a signature scheme permitting message recovery, the definition of the key generation and signing algorithms are as described previously, but the verification algorithm is replaced by a "recovery algorithm" which takes the public key pk and the enhanced signature x and returns $Recover_{pk}$ $(x) \in \{0,1\}^* \cup \{REJECT\}$. The distinguished point REJECT is used to indicate that the recipient rejected the signature; a return value of $M \in \{0,1\}^*$ indicates that the verifier accepts the message M as authentic. The formulation of security is the same as that above except for what it means for the forger to be successful. In particular, it should provide an x such that $M=Recover_{pk}(x) \in \{0,1\}^*$, where M was not a previous signing query. If x was produced via $x \leftarrow Sign_{sk}$ (M), then $Recover_{pk}$ (x)=M.

A simple variant of the PSS scheme achieves message recovery. The scheme PSS-R [$k_0$, $k_1$] includes the same key generation algorithm GenPSS as previously described. As with PSS, the signing and verification algorithms depend on hash function h: $\{0,1\}^* \times \{0,1\}^* \rightarrow \{0,1\}^{k1}$ and g: $\{0,1\}^* \rightarrow \{0,1\}^{k-k1-1}$, and the same $g_1$ and $g_2$ notation is used as before. For simplicity of explanation, it is assumed that the messages to be signed have length exactly $n=k-k_0-k_1-1$. Thus, possible choices of parameters are k 1024, with $k_0=k_1$=128 and n=767. As previously noted, these values are merely representative. In this embodiment, an enhanced signature of only k bits is generated from which the verifier can recover the n-bit message and simultaneously check authenticity. Signature generation and verification proceed as follows:

SignPSS-R(M)

$r \leftarrow \{0,1\}^{k0}$; $w \leftarrow h(r,M)$; $r^* \leftarrow g_1(w) \oplus r$ $M^* \leftarrow g_2(w) \oplus M$ $y \leftarrow 0|w|r^*|M^*$ return $y^d$ mod N RecoverPSS-R (x)

$y \leftarrow x^e$ mod N

Let y be decomposed into: b|w|r*|M*,
(where b is the first bit of y, w the next $k_1$ bits, n* the next $k_0$ bits, and M the remaining r bits)

$r \leftarrow r^* \oplus g_1(w)$ $M \leftarrow <M^* \oplus g_2(w)$ if (h(r,M)=w and b=0), then return M; otherwise, return REJECT.

Thus, SignPSS-R differs with respect to the signature algorithm of the first embodiment (SignPSS) in that the last part of the image y is not $g_2(w)$. Instead, $g_2(w)$ is used to "mask" the message, and the masked message M* is the last part of the image point y. This scheme is then easily adapted to handle messages of arbitrary length. A fully-specified scheme preferably would use about min$\{k, n+k_0+k_1+16\}$ bits for the enhanced signature of the n-bit message M.

The present invention extends to Rabin signatures, yielding a signature scheme and a signing with recovery scheme whose security can be tightly related to the hardness of factoring. In the basic Rabin signature scheme described in *Digitalized Signatures and Public Key Functions as Intractable as Factorization,* MIT/LCS/TR-221, January 1979, the signer chooses a number N=pg that is the product of two large primes, and the signer further chooses a number $0 \leq b < N$ (for example, the signer may choose b=0). The signer's public key is (N,b) and the corresponding secret key is (p,q,b). To sign a message M, the signer chooses a random seed r and computes a hash w=h(r,M) The point w is regarded as a value in $Z_N^*$, the multiplicative group of integers modulo N. The signer then checks if the equation x(x+b)=w has a solution in the multiplicative group of integers modulo N. This can be done using the signer's private key in a manner well-known in the art and described by Rabin. If the above equation has no solution, then the signer chooses a new random seed r and repeats the process described above. If the equation does have a solution the signer chooses one such solution, call it x, and the signature of M is taken to be the ordered pair (x,r).

An analogous scheme is implemented in the present invention and has equally efficient computation time but shorter signatures (because there is no need to separately transmit the seed r as part of the signature).

The probabilistic Rabin scheme is defined by PRab[$k_0$, $k_1$]=(GenPRab, SignPRab, VerifyPRab), and depends on parameters $k_0$, $k_1$, where $k_0+k_1 \leq k$. Algorithm GenPRab, on input k, picks a pair of random distinct (k/2)-bit primes p,q and multiplies them to produce the k-bit modulus N. It outputs (pk,sk), where pk=N and sk=(N, p,q).

The signing and verifying algorithms of PRab preferably use hash functions h,g, where h: $\{0,1\}^* \times \{0,1\}^* \to \{0,1\}^{k1}$ and g: $\{0,1\}^{k1} \to \{0,1\}^{k-k1}$. In particular, let $g_1$ be the function that on input $w \in \{0,1\}^{k1}$ returns the first $k_0$ bits of g(w) and let $g_2$ be the function that on input $w \in \{0,1\}^{k1}$ returns the remaining $k-k_0-k_1$ bits of g(w)

Figure 4:
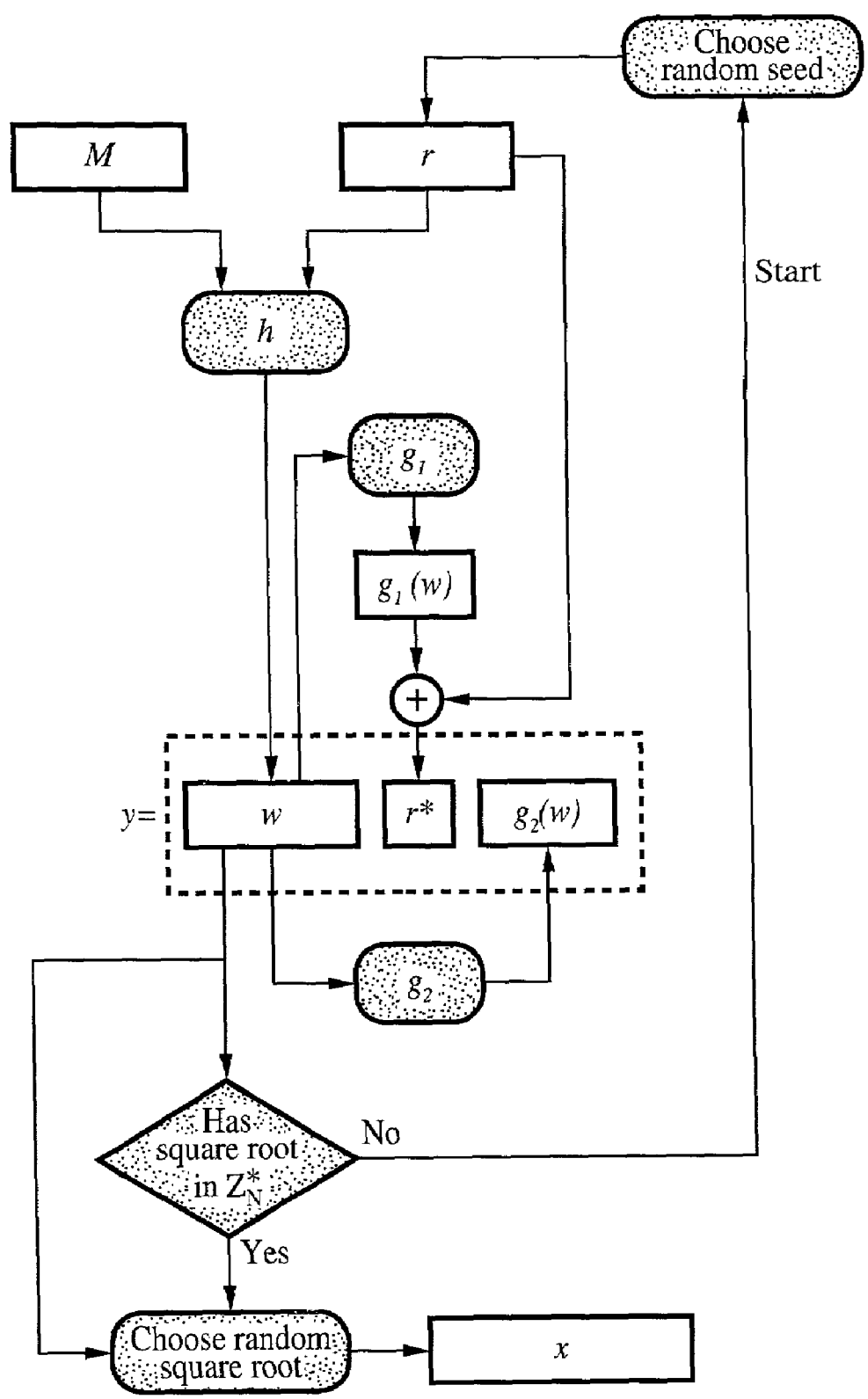
FIG. 4 is a diagram illustrating a preferred technique for implementing the present invention with a Rabin signature scheme.

The signing procedure, SignPRab, is similar to the corresponding SignPSS, but this routine returns a random square root of the image y, as opposed to $y^d$ mod N. The verification procedure checks if the square of the signature has the correct image. Thus verification is particularly fast. Here, in full, are preferred forms of SignPRab (illustrated in FIG. 4) and VerifyPRab:

SignPRab (M)
  repeat $r \leftarrow \{0,1\}^{k0}; \; w \leftarrow h(r,M); \; r^* \leftarrow g_1(w) \oplus r$ $y \leftarrow w|r^*|g_2(w)$ until $y \in Z^*_N$ and y is a quadratic residue mod N.
  Let $\{x_1, x_2, x_3, x_4\}$ be the four distinct square roots of y in $Z^*_N$.
  Choose $x \leftarrow \{x_1, x_2, x_3, x_4\}$ at random.
  return x.

VerifyPRab (M,x)

$y \leftarrow x^2$ mod N

Break up y as $w|r^*|Y$. (That is, let w be the first $k_1$ bits of y, $r^*$ the next $k_0$ bits, and Y the remaining bits.)

$r \leftarrow r^* \oplus g_1(w)$ if (h(r,M)=w and $g_2(w)$=Y) then return 1; else return 0.

As with PSS, one can add message recovery to the Rabin scheme in the same way, resulting in a probabilistic Rabin signing-with-recovery scheme, PRab-R. Its security is the same as that of the Rabin-based scheme.

Thus, in the Rabin schemes, the seed value r is chosen repeatedly until the image string y is in the domain of the decryption primitive and the primitive is the probabilistic function that returns a random square root of the image point in the multiplicative group of integers modulo a product of two primes. Thus, a "Rabin decryption primitive" is a map which takes a square $x^2$ in $Z_N^*$ and returns a random square root of $x^2$. The seed itself is encoded into the image point so that it does not have to be transmitted separately from the decrypted image point.

Note that an RSA-based scheme could take on a similar form, where the seed value is chosen repeatedly until y is in the domain; in such case, the leading "0" bit of y (as described above) would not be necessary. Moreover, variants of Rabin encryption, such as those described in ISO/IEC 9796, could be applied (in the Rabin scheme above) to reduce the number of iterations.

The previously described PSS, PSS-R, Prab, and PRab-R schemes require a concrete hash function h with output length some given number $k_1$. Typically, H may be constructed from some cryptographic hash function H such as H=MD5 or H=SHA-1. A simple technique is to define h(x) as the appropriate-length prefix of:

h(const.<0>.x|h(const.<1>.x|h(const.<2>.x| . . . .

The constant const should be unique to h. To make another hash function, g, one simply selects a different constant. Many similar such constructions are possible of course.

The present invention provides numerous advantages. It can be shown that the security of the PSS (or PSS-R) is based on the security of RSA, but with a relationship between the two that is much "tighter" than in the prior art. In particular, it has been shown that if the RSA generator is (t', $\in$') secure, then for any $q_{sig}$, $q_{hash}$, the signature scheme PSS[$k_0$, $k_1$] (or PSS-R) is (t, $q_{sig}$, $q_{hash}$, $\in$)-secure, where:

$t(k)=t'(k)-[q_{sig}(k)+q_{hash}(k)+1] \cdot k_0 \cdot \Theta(k^3)$, and $\in(k)=\in'(k)+[3(q_{sig}(k)+q_{hash}(k))^2] \cdot (2^{-k0}+2^{-k1})$.

With respect to the Rabin probabilistic scheme, it has been shown that if factoring is (t',e')-hard, then, for any $q_{sig}$, $q_{hash}$, the signature scheme PRab[$k_0$,$k_1$] is (t, $q_{sig}$, $q_{hash}$, $\in$)-secure, where:

$t(k)=t'(k)-[q_{sig}(k)+q_{hash}(k)+1] \cdot k_0 \cdot \Theta(k^2)$, and $\in(k)=2\in'(k)+[6(q_{sig}(k)+q_{hash}(k))^2] \cdot (2^{-k0}+2^{-k1})$.

One of the preferred implementation of the probabilistic signature scheme of the present invention is a computer program. One implementation is in conjunction with a development toolkit. Thus, each of the algorithms of the invention are preferably implemented as a set of instructions (program code or instruction means) in a code module resident in the random access memory (RAM) of a computer. The set of instructions (or some portion thereof) may be stored in another computer memory or downloaded via the Internet or other computer network.

The computer program comprising the probabilistic signature scheme is executed in a computer. The computer used in the present invention is any personal computer or workstation client or server platform that is Intel-, PowerPC®- or RISC®-based, and that includes an operating system such as IBM® OS/2®, Microsoft Windows 95, Microsoft Windows NT 4.0, Unix, AIX®, OS/400 or the like.

Although not required, the various processing routines that comprise the present invention may reside on the same host machine or on different machines interconnected over a network (e.g., the Internet, an intranet, a wide area network (WAN) or local area network (LAN)). Thus, for example, the signature of the message may be performed on one machine, with the associated verification then performed on another machine. Thus, a computer running the present invention has appropriate networking hardware to establish a connection to another computer in a conventional manner.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The particular message "content" is not a limitation of the present invention. Thus, the message may be generalized as any "data string" irrespective of the particular application for which the digital signature scheme is to be used.

Having thus described our invention, what we claim as new and desire to secure by Letters Patent is set forth in the following claims.

The invention claimed is:

1. A method of signing a data string, comprising the steps of:
  (a) hashing the data string and a seed value to generate a hash value;
  (b) encoding into an image point the hash value, the seed value, and a given portion of the data string; and (c) applying a given decryption primitive to the image point to obtain a digital signature of the data string.

2. The method of digital signing as described in claim 1 further including the step of concatenating the digital signature with a remaining portion of the data string to facilitate subsequent authentication.

3. The method of digital signing as described in claim 2 wherein the data string is recoverable from the given portion and the remaining portion.

4. The method of digital signing as described in claim 1 wherein the given portion of the data string is the data string.

5. The method of digital signing as described in claim 1 wherein the given portion of the data string is a null value.

6. The method of digital signing as described in claim 1 wherein the hash of the data string and the seed value in step 1(a) is computed by hashing a concatenation of the seed value and the data string.

7. The method of digital signing as described in claim 1 wherein the hash value, the seed value and the given portion of the data string are each recoverable given the image point.

8. The method as described in claim 1 wherein the given decryption primitive is the RSA decryption primitive.

9. The method as described in claim 1 wherein the seed value is selected from a group of seed values consisting essentially of a random value, a pseudorandom value, and a time-varying value.

10. A computer-implemented method of signing and authenticating a data string M having a first portion M1 and a second portion M2, wherein the data string is recoverable from M1 and M2, comprising the steps of:
   (a) hashing the data string and a random seed r to generate a hash value h(r,M);
   (b) encoding into an image point y the hash value h(r,M), the random seed r, and the second portion M2 of the data string;
   (c) applying a decryption primitive to the image point y to obtain a digital signature x of the data string; and
   (d) associating the digital signature x with the first portion M1 of the data string.

11. The computer-implemented method as described in claim 10 wherein the digital signature is authenticated by:
   (e) applying an encryption primitive to the digital signature x to generate a candidate image point;
   (f) decoding the candidate image point to generate candidate values corresponding to the hash value h(r,M), the random seed r, and the second portion M2 of the data string;
   (g) forming a candidate data string by combining the candidate value for the second part M2 of the data string with the first portion M1;
   (h) verifying at least that the candidate value for the hash value h(r,M) equals the hash of (i) the candidate value for the random seed and (ii) the candidate data string; and
   (i) accepting the candidate data string as the data string M if the verification in step 13(h) is positive.

12. The computer-implemented method as described in claim 10 wherein the data string is signed in a first computer and the digital signature is authenticated in a second computer.

13. The computer-implemented method as described in claim 10 wherein the decryption primitive is the RSA decryption primitive.

14. The computer-implemented method as described in claim 11 wherein the encryption primitive is the RSA encryption primitive.

15. A method of authenticating a digital signature x of a data string M, wherein the digital signature x has been generated by applying a given decryption primitive to an image point y, the image point y comprising a function of a seed value r, a hash value h(r,M), and a given portion of the data string, the method comprising the steps of:
   (a) applying a given encryption primitive to the digital signature to generate a candidate image point;
   (b) decoding the candidate image point to generate candidate values corresponding to the seed value r, the hash value h(r,M), and the given portion of the data string;
   (c) forming a candidate data string by combining the candidate value for the given portion of the data string with other information;
   (d) verifying at least that the candidate value for the hash value h(r,M) equals the hash of (i) the candidate value for the seed value and (ii) the candidate data string; and
   (e) accepting the candidate data string as the data string M if the verification in step (d) is positive.

16. A computer-implemented cryptographic system, comprising:
   means for signing a data string M, the signing means comprising:
      means for hashing a function of the data string and a seed value to generate a hash value;
      means for encoding into an image point the hash value, the seed value, and a given portion of the data string; and
      means, using a given primitive, for decrypting the image point to obtain a digital signature of the data string; and
   means for authenticating the digital signature, the authenticating means comprising:
      means, using a given primitive, for encrypting the digital signature to generate a candidate image point;
      means for decoding the candidate image point to generate candidate values corresponding to the seed value, the hash value, and the given portion of the data string;
      means for generating a candidate data string from at least the candidate value of the given portion of the data string;
      means for verifying at least that the candidate value for the hash value corresponds to the hash of the candidate seed and the candidate data string; and
      means responsive to the verifying means for accepting the candidate data string as the data string.

17. A computer program product in a computer-readable medium for signing a data string M, comprising:
   means for hashing the data string and a random seed value to generate a keyed hash value;
   means for encoding into an image point the keyed hash value, the random seed value and a given portion of the data string; and
   means, using a given primitive, for decrypting the image point to obtain a digital signature of the data string.

18. The computer program product as described in claim 17 wherein the given primitive is the RSA decryption primitive.

19. The computer program product as described in claim 17 wherein the given portion of the data string is the data string.

20. The computer program product as described in claim 17 wherein the given function is an output of a generator applied to the keyed hash value.

21. A computer-implemented method of signing a data string M having a first portion M1 and a second portion M2, wherein the data string is recoverable from M1 and M2, comprising the steps of:
(a) selecting a random seed r;
(b) hashing the data string and the random seed r to generate a hash value h(r,M);
(c) encoding into an image point y the hash value h(r,M), the random seed r, and the second portion M2 of the data string; and
(d) applying a decryption primitive to the image point y to obtain a digital signature x of the data string;
wherein the random seed r is selected so that the image string y is in the domain of the decryption primitive.

22. The method as described in claim 21 further including the step of:
(e) concatenating the digital signature x with the first portion M1 of the data string.

23. The method as described in claim 21 wherein the decryption primitive is a Rabin decryption primitive.

* * * * *

Disclaimer

7,036,014 — Mihir Bellare, San Diego, CA (US); and Phillip Rogaway, Davis, CA (US). PROBABILISTIC SIGNATURE SCHEME. Patent dated April 25, 2006. Disclaimer filed February 8, 2007, by the assignee, The Regents of the University of California.

Hereby enters this disclaimer to all of the claims, of said patent.

*(Official Gazette, May 27, 2008)*